United States Patent
Iwase et al.

(10) Patent No.: US 7,740,556 B2
(45) Date of Patent: Jun. 22, 2010

(54) HYDRAULIC CONTROL APPARATUS AND HYDRAULIC CONTROL METHOD

(75) Inventors: Yuji Iwase, Susono (JP); Masami Sugaya, Susono (JP); Hiroyuki Nishizawa, Tajimi (JP); Kisaburo Hayakawa, Nagoya (JP); Masataka Osawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1117 days.

(21) Appl. No.: 10/564,973

(22) PCT Filed: Jul. 16, 2004

(86) PCT No.: PCT/IB2004/002304

§ 371 (c)(1),
(2), (4) Date: Jan. 18, 2006

(87) PCT Pub. No.: WO2005/008077

PCT Pub. Date: Jan. 27, 2005

(65) Prior Publication Data

US 2006/0174757 A1    Aug. 10, 2006

(30) Foreign Application Priority Data

Jul. 18, 2003  (JP)  .............................. 2003-276598

(51) Int. Cl.
*F16H 15/38* (2006.01)
(52) U.S. Cl. ............................ 476/10; 476/40; 91/509
(58) Field of Classification Search ............... 476/9, 476/10, 40, 42, 46; 91/509
See application file for complete search history.

(56) References Cited

U.S. PATENT DOCUMENTS

| 5,615,593 | A   | * | 4/1997 | Anderson et al. ............. 91/509 |
| 6,193,627 | B1  |   | 2/2001 | Bart |
| 2002/0121087 | A1 |   | 9/2002 | Van Den Bossche et al. |

FOREIGN PATENT DOCUMENTS

| GB | 2 053 419 | 2/1981 |
| GB | 2 318 426 | 4/1998 |
| JP | 47-14587 | 8/1972 |
| JP | 61-143296 | 6/1986 |
| JP | 63-72444 | 4/1988 |
| JP | 10-213213 | 8/1998 |
| JP | 2002-276786 | 9/2002 |

* cited by examiner

*Primary Examiner*—William C Joyce
(74) *Attorney, Agent, or Firm*—Oblon, Spivak, McClelland, Maier & Neustadt, L.L.P.

(57) ABSTRACT

A hydraulic control apparatus includes two oil flow control valves (30, 32) each provided with a supply control portion (36, 38, 52, 54) for controlling an oil supply from a pressurized oil source, and a discharge control portion (40, 42, 56, 58) for controlling connection with a discharge passage. One of those oil flow control valves supplies/discharges oil to/from one of hydraulic chambers (22, 24) that are oppositely formed in a hydraulic servo mechanism. An operation direction of the hydraulic servo mechanism is performed by operating one of the oil flow control valves. The other operation direction of the hydraulic servo mechanism is performed by operating the other oil flow control valve.

20 Claims, 4 Drawing Sheets

HYDRAULIC CONTROL APPARATUS AND HYDRAULIC CONTROL METHOD

BACKGROUND OF THE INVENTION

1. Field of Invention

The invention relates to a hydraulic control apparatus and method, and more particularly, to a hydraulic control apparatus and method for a hydraulic servo unit in which an operation direction is selected to a first direction when oil is supplied from a first port and discharged from a second port, and to a second direction opposite to the first direction when the oil is supplied from the second port and discharged from the first port.

2. Description of Related Art

The servo mechanism having a first port and a second port is structured to select its operation direction to a first direction when oil is supplied from the first port and discharged from the second port, and to a second direction opposite to the first direction when the oil is supplied from the second port and discharged from the first port. The above structured servo mechanism is well known as being employed for various types of machines in an automotive field, for example, a transmission, especially a toroidal type or a belt type continuously variable transmission.

The servo mechanism is provided with a hydraulic circuit having a servo valve that functions in selecting an oil supply from a pressurized oil source between the first port and the second port, while selecting a connection with a discharge oil passage between the first port and the second port. Generally the servo valve employed for the aforementioned hydraulic circuit has two oil supply ports, one of which is connected to a pressurized oil supply port and two drain ports, one of which is connected to a discharge oil passage in response to selection of a valve spool position, which is referred to as so-called a 4-port type servo valve. An example of the hydraulic circuit including the 4-port type servo valve, which is employed for the toroidal type continuously variable transmission has been disclosed in Japanese Patent Application Laid-open No. JP-A-2002-276786.

In the structure where the 4-port type servo valve serves to control operations of the servo mechanism, when a sticking or the like occurs in the servo valve and as a result, the oil supply to one of the ports cannot be stopped, the operation of the servo mechanism in one direction cannot be stopped. In the case where the servo mechanism is mounted in a transmission for a vehicle, the aforementioned failure may not be able to control the speed ratio.

SUMMARY OF THE INVENTION

It is an object of the invention to provide an improved hydraulic control apparatus and method capable of preventing the servo mechanism from losing a normal control function owing to sticking of the valve and the like.

According to the invention, a hydraulic control apparatus is provided for a hydraulic servo unit that selectively changes an operation direction between a first direction when an oil is supplied from a first port and discharged from a second port and a second direction opposite to the first direction when the oil is supplied from the second port and discharged from the first port. The hydraulic control apparatus includes a first oil flow control valve and a second oil flow control valve each having an oil supply control portion that controls an oil supply from a pressurized oil source, and an oil discharge control portion that controls a connection with an oil discharge passage, and a control valve operation control unit that controls each operation of the first and the second oil flow control valves. The first port receives an oil supply from the oil supply control portion of the first oil flow control valve, and discharges the oil through the oil discharge control portion of the second oil flow control valve, and the second port receives the oil supply from the oil supply control portion of the second oil flow control valve, and discharges the oil through the oil discharge control portion of the first oil flow control valve. An operation state of the hydraulic servo unit is controlled by the control valve operation control unit that controls each operation of the first and the second oil flow control valves. The aforementioned hydraulic control apparatus is suitable for a control of a toroidal type continuously variable transmission.

In the above-described hydraulic control apparatus, the control valve operation control unit may control only the first oil flow control valve by interrupting the control of the second oil flow control valve that supplies the oil from the pressurized oil source and passes the oil into the oil discharge passage such that the operation direction of the hydraulic servo unit is selected to the first operation direction. The control valve operation control unit may also control only the second oil flow control valve by interrupting the control of the first oil flow control valve that supplies the oil from the pressurized oil source and passes the oil into the oil discharge passage such that the operation direction of the hydraulic servo unit is selected to the second operation direction.

The hydraulic control apparatus may be provided with an oil passage selection unit that selectively changes an inlet between the first port and the second port.

The hydraulic control apparatus may be provided with a depressurize oil supply unit that supplies a pressurized oil from the pressurized oil source, which has been depressurized to at least one of the first and the second ports by bypassing the first and the second oil flow control valves. In this case, the hydraulic servo unit may be a transmission for a vehicle, and the pressurized oil may be supplied to a port to which the pressurized oil is supplied for an upshifting operation of the transmission by the depressurize oil supply unit. The depressurize oil supply unit may be continuously operated on the regular basis. However, the depressurize oil supply unit may be activated when one of the first and the second oil flow control valves fails to supply the pressurized oil. In the hydraulic control apparatus, an oil pressure of the pressurized oil source may be temporarily increased when the depressurize oil supply unit is operated. Also, a control for reducing a torque input to the hydraulic servo unit, for example, an engine torque may be executed when the depressurize oil supply unit is operated.

The hydraulic control apparatus may be formed as a transmission control apparatus which is suitable for the control of a transmission, especially a toroidal type continuously variable transmission.

According to the invention, a hydraulic control apparatus is provided for a hydraulic servo unit that selectively changes an operation direction between a first direction when an oil is supplied from a first port and discharged from a second port and a second direction opposite to the first direction when the oil is supplied from the second port and discharged from the first port. The hydraulic control apparatus includes a first oil flow control valve and a second oil flow control valve each having an oil supply control portion that controls an oil supply from a pressurized oil source, and an oil discharge control portion that controls a connection with an oil discharge passage, and a control valve operation control unit that controls each operation of the first and the second oil flow control valves. The first port receives an oil supply from the oil supply control portion of the first oil flow control valve, and discharges the oil through the oil discharge control portion of the second oil flow control valve, and the second port receives the oil supply from the oil supply control portion of the second oil flow control valve, and discharges the oil through the oil discharge control portion of the first oil flow control valve. An operation state of the hydraulic servo unit is controlled by the control valve operation control unit that controls each operation of the first and the second oil flow control valves. Accordingly when the first and the second oil flow control valves are normally operated, only one of those valves may be operated to bring the operation state into the first operation direction or the second operation direction. When a failure occurs in one of the first and the second oil flow control valves and the oil supply therefrom cannot be stopped, the other oil flow control valve is activated to suppress the excessive oil supply such that the operation state of the hydraulic servo unit is maintained at a normal state.

When the operation state of the hydraulic servo unit is changed into the first operation state, only the first oil flow control valve may be operated. Likewise when the operation state of the hydraulic servo unit is changed into the second operation state, only the second oil flow control valve may be operated. When a failure occurs in one of the first and the second oil flow control valves and the oil supply therefrom cannot be stopped, the other oil flow control valve is activated to suppress the excessive oil supply such that the operation state of the hydraulic servo unit is maintained at a normal state.

According to the invention, the control valve operation control unit controls only the first oil flow control valve by interrupting the control of the second oil flow control valve that supplies the oil from the pressurized oil source and passes the oil into the oil discharge passage such that the operation direction of the hydraulic servo unit is selected to the first operation direction. The control valve operation control unit also controls only the second oil flow control valve by interrupting the control of the first oil flow control valve that supplies the oil from the pressurized oil source and passes the oil into the oil discharge passage such that the operation direction of the hydraulic servo unit is selected to the second operation direction. Only one of the first and the second oil flow control valves may be operated for controlling each phase of various operation states of the hydraulic servo unit. This makes it possible to maintain the control procedure simple even if a single 4-port type control valve is divided into two units.

In the hydraulic control apparatus, when a sticking occurs in the first oil flow control valve and oil supply therefrom cannot be stopped, the second oil flow control valve may be activated and opened. Accordingly, the oil supplied from the first oil flow control valve is discharged into the discharge oil passage so as to prevent the hydraulic servo unit from passing over a predetermined target value and further going too far in the first operation direction. The overrunning hydraulic servo unit in the first operation direction can also be returned into the original position, if necessary. In this case, so long as the amount of oil continuously supplied from the first oil flow control valve does not correspond to the amount obtained when the valve is fully opened, the second oil flow control valve supplies oil sufficient to change the hydraulic servo unit into the second operation direction against the oil flow supplied from the first oil flow control valve by appropriately increasing its opening degree. When a sticking occurs in the second oil flow control valve and oil supply therefrom cannot be stopped, the similar control as described above may be executed by the first oil flow control valve.

According to the invention, the hydraulic control apparatus is provided with an oil passage selection unit that selectively changes an inlet between the first port and the second port. In the case where the oil supply control portion of one of the first and the second oil flow control valves fails to supply oil, an inlet of the first and the second ports is temporarily changed such that the oil may be supplied from the oil supply control portion of the other of the first and the second oil flow control valves, thus operating the servo unit appropriately.

According to the invention, the hydraulic control apparatus is provided with a depressurize oil supply unit that supplies a pressurized oil from the pressurized oil source, which has been depressurized to at least one of the first and the second ports by bypassing the first and the second oil flow control valves. Even when the hydraulic pressure cannot be supplied owing to the sticking or disconnection in one of the first and the second oil flow control valves, the depressurize oil source ensures controllability both in the first and the second operation directions without the use of the servo valves.

According to the invention, the hydraulic servo unit is a transmission for a vehicle, and the pressurized oil is supplied to a port to which the pressurized oil is supplied for an upshifting operation of the transmission by the depressurize oil supply unit. Accordingly even when a predetermined hydraulic pressure cannot be supplied to the port for the upshifting operation owing to a certain failure in one of the first and the second oil flow control valves, downshifting of the transmission may be avoided. The depressurize oil supply unit may be continuously operated. However, the depressurize oil supply unit may be easily activated upon detection of the absence of the predetermined hydraulic pressure from one of the first and the second oil flow control valves. The depressurize oil supply unit may be activated when one of the first and the second oil flow control valves fails to supply the pressurized oil. This makes it possible to provide effective control only in an emergency without deteriorating the control executed in the normal state.

According to the invention, an oil pressure of the pressurize oil source is temporarily increased when the depressurize oil supply unit is operated. Even if the depressurize oil supply unit is continuously operated, it may function most effectively as needed while reducing the deterioration in the control as least as possible.

According to the invention, a control for reducing a torque input to the hydraulic servo unit, for example, an engine torque is executed when the depressurize oil supply unit is operated. In the case where the hydraulic servo unit (continuously variable transmission) is controlled only by the pressurized oil from the depressurize oil supply unit, the possibility that may bring the hydraulic servo unit into the unfavorable condition, for example, downshifting operation, may be eliminated.

In the case where the hydraulic servo unit is the transmission control unit for the toroidal type continuously variable transmission, the control hydraulic pressure is required to be individually supplied for the upshifting operation and the downshifting operation of the transmission. Accordingly, the invention is suitable for the control of hydraulic pressures by the corresponding oil flow control valves, respectively.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
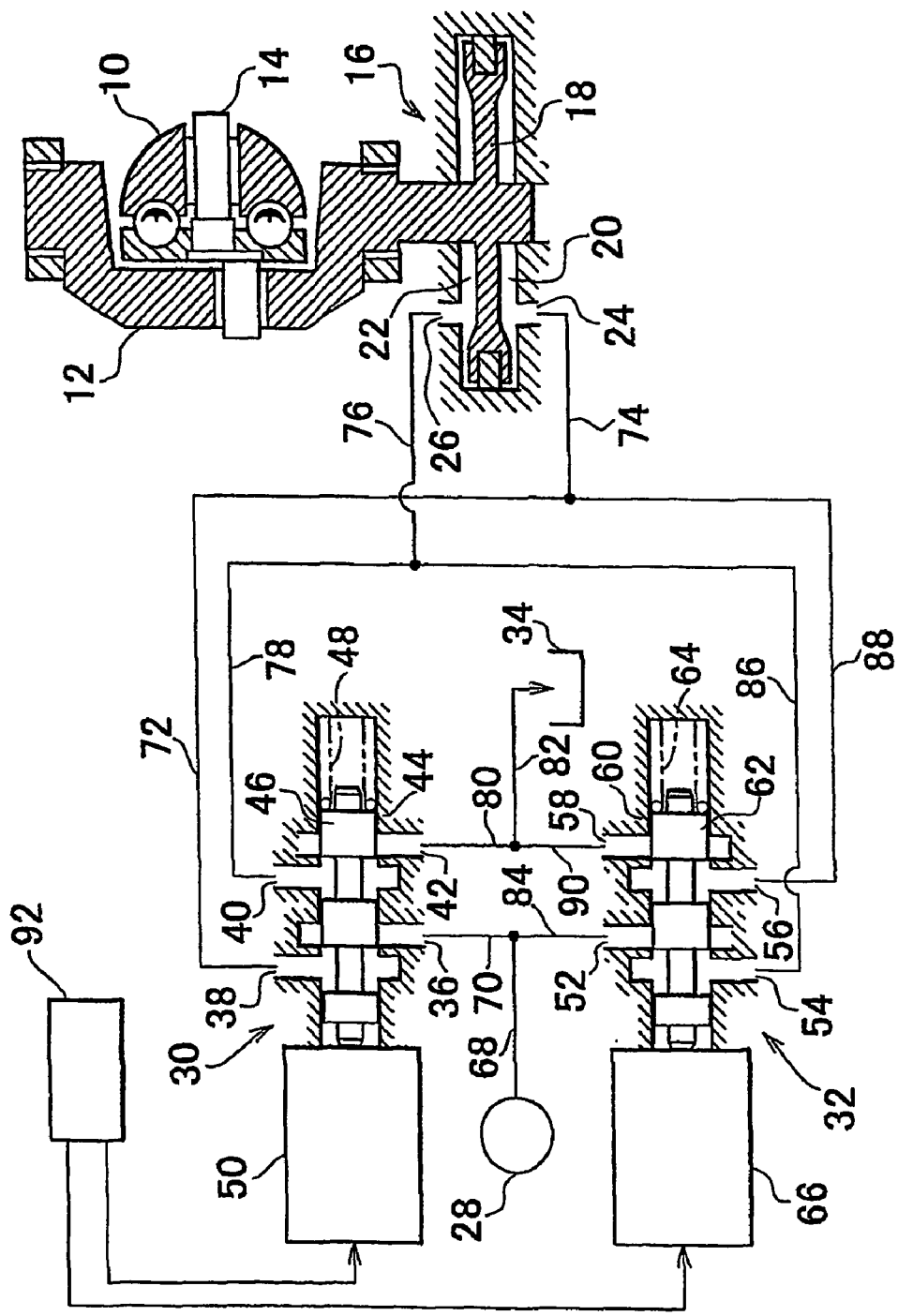
FIG. 1 schematically shows an embodiment of the invention applied to a hydraulic control apparatus for a toroidal type continuously variable transmission.

FIG. 1 schematically shows an embodiment of the invention applied to a hydraulic control apparatus for controlling a toroidal type continuously variable transmission. Referring to FIG. 1, a power roller 10 in a known toroidal type continuously variable transmission (hereinafter referred to as CVT) is supported by a trunnion 12 via an eccentric shaft 14, and interposed between a pair of discs (not shown). A speed ratio of a rotating power transferred between the pair of discs can be varied by changing a tilted angle of the power roller 10 with respect to the discs. The tilted angle of the power roller 10 with respect to the discs is changed by a hydraulic actuator 16 that temporarily displaces the trunnion 12 in a vertical direction.

So long as a center axis of the power roller 10 intersects with a center axis of the disc, the force of the disc at a drive side applied to the power roller 10 acts in parallel to the tilted axis of the power roller 10 at a contact point between the disc and the power roller irrespective of the tilted angle of the power roller. In this case, the force that changes the tilted angle is not applied to the power roller. In the case where the center axis of the power roller is displaced upward or downward with respect to the center axis of the disc, if the displacement direction is along the rotating direction of the disc seen from the contact between the power roller and the disc at the drive side, the power roller receives the force that directs it toward the center of the disc at the drive side. As a result, the power roller is tilted in the direction where the speed ratio is increased (that is, downshifting direction). Meanwhile, if the displacement direction is opposite to the rotating direction of the disc, the power roller receives the force that makes it away from the center of the disc at the drive side. As a result, the power roller is tilted in the direction where the speed ratio is decreased (that is, upshifting direction).

When the speed ratio is required to be held constant, the force that resists against the driving force applied to the power roller from the disc at the drive side is applied to the trunnion. Then the power roller is held at a position intersecting with the center axis of the drive disc (or driven disc). When the speed ratio is required to be varied, the center axis of the power roller is temporarily displaced with respect to the center axis of the disc as needed such that the speed ratio is adjusted. In the embodiment shown in the drawing, the power roller 10 is structured to be driven downward at the point in contact with the drive disc (not shown). When the power roller 10 is displaced downward from the neutral position that makes its center axis intersected with the center axis of the drive disc, the speed ratio is increased (downshifted). When the power roller 10 is displaced upward from the neutral position, the speed ratio is decreased (upshifted).

The hydraulic actuator 16 includes a piston 18 connected to a lower end of the trunnion 12, a hydraulic chamber 20 formed below the piston 18, and a hydraulic chamber 22 formed above the piston 18. As oil is supplied from a port 24 into the hydraulic chamber 20, and the oil in the hydraulic chamber 22 is discharged from the port 26, the piston 18 is displaced upward such that upshifting is performed. When the oil is supplied from the port 26 into the hydraulic chamber 22, and the oil in the hydraulic chamber 22 is discharged from the port 24, the piston 18 is displaced downward such that downshifting is performed.

A strong pressing force is exerted to each space between the power roller and the drive disc, and the power roller and the driven disc so as to generate the frictional force sufficient to transfer the required rotating power. As described above, the driving force in the downward direction is applied to the power roller 10 from the disc at the drive side. Accordingly the force for displacing the trunnion 12 upward has to be especially strong. The process for controlling the oil in this case refers to so called a hydraulic control. The transmission control in the toroidal type CVT is executed by displacing the power roller in the vertical direction. As the oil exhibits uncompressibility, the operation of the hydraulic control apparatus according to the invention is executed by controlling the respective amount of oil to be supplied/discharged into/from the hydraulic chambers 20 and 22.

The hydraulic control apparatus for controlling supply/discharge of oil to/from the respective hydraulic chambers 20 and 22 includes a pressurized oil source 28 such as an oil pressure pump, two oil flow control valves 30, 32, and an oil sump 34 as shown in FIG. 1. The oil flow control valve 30 includes a valve housing 44 provided with a supply inlet port 36, a supply outlet port 38, a discharge inlet port 40, and a discharge outlet port 42, a valve spool 46 for controlling connection or blockage between the ports 36 and 38, or between the ports 40 and 42, respectively, a compression coil spring 48 that urges the valve spool 46 to the position where the space between the ports 36 and 38 or the ports 40 and 42 is communicated or blocked, and an electromagnetic drive unit 50 that drives to move the valve spool 46 to the position where the space between the ports 36 and 38 or between the ports 40 and 42 is communicated against the spring force of the compression coil spring 48.

Similarly the oil flow control valve 32 includes a valve housing 60 provided with a supply inlet port 52, a supply outlet port 54, a discharge inlet port 56, and a discharge outlet port 58, a valve spool 62 for controlling connection or blockage between the ports 52 and 54, or between the ports 56 and 58, respectively, a compression coil spring 64 that urges the valve spool 62 to the position where the space between the ports 52 and 54 or the ports 56 and 58 is communicated or blocked, and an electromagnetic drive unit 66 that drives to move the valve spool 62 to the position where the space between the ports 52 and 54 or between the ports 56 and 58 is communicated against the spring force of the compression coil spring 64.

The pressurized oil source 28 is connected to the supply inlet port 36 of the oil flow control valve 30 via oil passages 68 and 70. Meanwhile, the corresponding supply outlet port 38 is connected to a port 24 of the toroidal type CVT via oil passages 72 and 74. A port 26 of the toroidal type CVT is connected to the discharge inlet port 40 of the oil flow control valve 30 via oil passages 76 and 78. The corresponding discharge outlet port 42 is connected to the oil sump 34 via oil passages 80 and 82.

The pressurized oil source 28 is also connected to the supply inlet port 52 of the oil flow control valve 32 via oil passages 68 and 84, and the corresponding supply outlet port 54 is connected to a port 26 of the toroidal type CVT via oil passages 86 and 76. The port 24 of the toroidal type CVT is connected to the discharge inlet port 56 of the oil flow control valve 32 via oil passages 74 and 88. The corresponding discharge outlet port 58 is connected to the oil sump 34 via oil passages 90 and 82. An electric current is applied to the electromagnetic drive units 50 and 66 of the respective oil flow control valves 30 and 32 under the control executed by the control valve operation control unit 92 with a microcomputer.

Figure 2A:
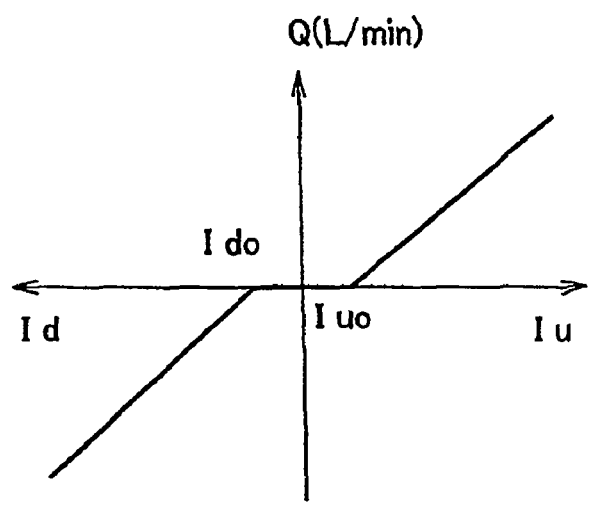
FIGS. 2A and 2B show an operation of a hydraulic control apparatus shown in FIG. 1, FIG. 2A representing each of relationships between currents Iu and Id supplied to electromagnetic drive units for oil flow control valves and a flow rate Q of a pressure oil supplied to hydraulic chambers, respectively, and FIG. 2B representing each of relationships between the currents Iu, Id and pressures Pu, Pd of the pressure oil supplied to the hydraulic chambers, respectively.
Figure 2B:
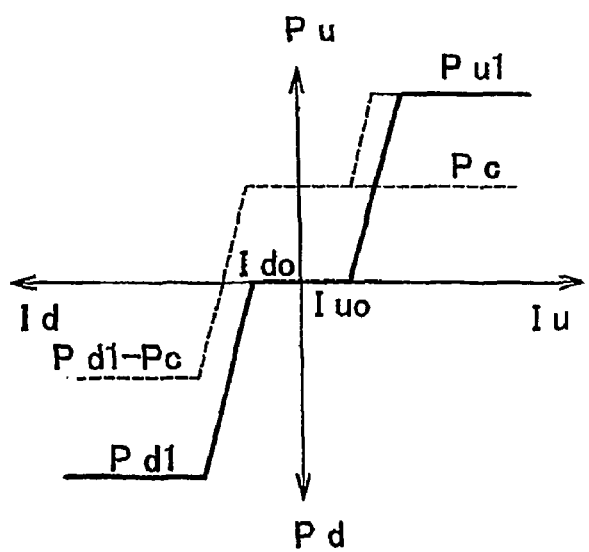

In the case where an arbitrary speed ratio is required to be reduced to a predetermined target value in the aforementioned structure, the control valve operation control unit 92 executes the control so as to supply the electric current Iu only to the electromagnetic drive unit 50 of the oil flow control valve 30. At a time when the current value becomes equal to or greater than the value Iu0 as shown in FIG. 2A, connection between the supply inlet port 36 and the supply outlet port 38 starts. Then the oil at the flow rate Q (L/min.) corresponding to the current value In is supplied into the hydraulic chamber 20 of the toroidal type CVT. The connection between the discharge inlet port 40 and the discharge outlet port 42 causes the other port 26 to be communicated with the oil sump 34. At a timing when the current exceeds the value Iu0 as shown in FIG. 2B, an oil pressure Pu within the hydraulic pressure chamber 20 is rapidly increased to reach the highest value Pu1.

When the piston 18 is displaced upward, the power roller is deflected in the direction where the speed ratio is decreased (upshifting direction). The resultant change in the speed ratio is detected by a sensor and the like (not shown) for detecting a deflection angle of the power roller. The signal sent from the sensor is transmitted to the control valve operation control unit 92. As the speed ratio varies, the control valve operation control unit 92 executes an appropriate feedback control. When it is determined that the required tilting of the power roller 10 has occurred or is expected to occur, the control valve operation control unit 92 serves to decrease the current to be supplied to the electromagnetic drive unit 50, and finally stops applying the current. Then the electric current Id is applied only to the electromagnetic drive unit 66 of the oil flow control valve 32 so as to return the piston 18 back to the neutral position. In this case, when the current value becomes equal to or greater than the value Ido, connection between the supply inlet port 52 and the supply outlet port 54 is allowed, and oil at the flow rate Q (L/min.) (−Q (L/min.) in consideration with the flow direction) corresponding to the electric current Id is supplied to the hydraulic chamber 22 of the toroidal type CVT. The connection between the discharge inlet port 56 and the discharge outlet port 58 causes the other port 24 to be communicated with the oil sump 34 as shown in FIG. 2A. The relationship between the electric current Id applied to the electromagnetic drive unit 66 of the oil flow control valve 32 and the oil pressure Pd supplied to the hydraulic chamber 22 is shown in FIG. 2B. The oil pressure Pd rapidly increases to the maximum value Pd1 from a timing when the electric current Id exceeds the value Ido.

Opposite to the upshifting control as described above, in the downshifting control for increasing the speed ratio of the CVT, the oil flow control valve 32 is only activated to displace the power roller 10 downward, and then the oil flow control valve 30 is only activated to displace the power roller 10 upward so as to be returned to the neutral position.

It is assumed that under the downshifting control for increasing the speed ratio of the CVT by activating the oil flow control valve 32, sticking occurs owing to a jam of a foreign matter and the like in the above described structure, and as a result, the valve spool 62 fails to return to the fully closed position after application of electric current to the electromagnetic drive unit 66 is stopped. If the aforementioned state is left, the oil is continuously supplied into the hydraulic chamber 22 of the CVT, causing the failure that the downshifting control is further continued over the target value of the speed ratio.

If the aforementioned abnormality is detected by a power roller deflection angle sensor (not shown), the oil flow control valve 30 is activated to allow connection between the discharge inlet port 40 and the discharge outlet port 42 such that the oil directed to the hydraulic chamber 22 of the CVT by the supply outlet port 54 of the oil flow control valve 32 where the sticking occurs is directed to be discharged into the oil sump 34. Meanwhile, the oil flowing into the supply outlet port 38 of the oil flow control valve 30 is supplied to the hydraulic chamber 20 of the CVT. This makes it possible to prevent abnormal increase in the speed ratio of the CVT quickly and to bring the speed ratio into the decreasing direction if necessary.

Similarly, it is assumed that under the upshifting control for decreasing the speed ratio of the CVT by activating the oil flow control valve 30, sticking occurs therein owing to a jam of a foreign matter and the like in the above described structure, and as a result, the valve spool 46 fails to return to the fully closed position after application of electric current to the electromagnetic drive unit 50 is stopped. If the aforementioned state is left, the oil is continuously supplied into the hydraulic chamber 20 of the CVT to hold the speed change ratio of the CVT minimum.

If the aforementioned abnormality is detected by the power roller angle sensor (not shown), the oil flow control valve 32 is activated to allow connection between the discharge inlet port 56 and the discharge outlet port 58 such that the oil directed from the supply inlet port 38 of the oil flow control valve 30 where sticking occurs to the hydraulic chamber 20 of the CVT is directed to be discharged into the oil sump 34. Meanwhile, the oil flowing into the supply outlet port 54 of the oil flow control valve 32 is supplied to the hydraulic chamber 22 of the CVT. This makes it possible to prevent abnormal decrease in the speed ratio of the CVT, and to bring the speed ratio into the increasing direction if necessary.

The jamming of a foreign matter in a valve seat in the oil flow control valve 30 or 32 may cause the failure that the valve spool fails to return to the fully closed position after application of the electric current to the electromagnetic drive unit 50 or 66 is stopped. The failure in the electric system of the electromagnetic drive unit 50 or 66 or jamming of a foreign matter in the valve seat may also cause the failure that no displacement occurs in the valve spool and accordingly, a predetermined pressurized oil does not flow into the supply outlet port 38 or 54 even when the electric current is applied to the electromagnetic drive unit 50 or 66.

In consideration with the aforementioned failure, the control for reducing the speed ratio of the CVT, that is, upshifting control is executed only by operating the oil flow control valve 30, and the control for increasing the speed ratio of the CVT, that is, downshifting control is executed only by operating the oil flow control valve 32. In this case, if the predetermined pressurized oil is not supplied to the supply outlet port 54 of the oil flow control valve 32 or the supply outlet port 38 of the oil flow control valve 30, the controllability of the upshifting or downshifting can be remained.

Figure 3:
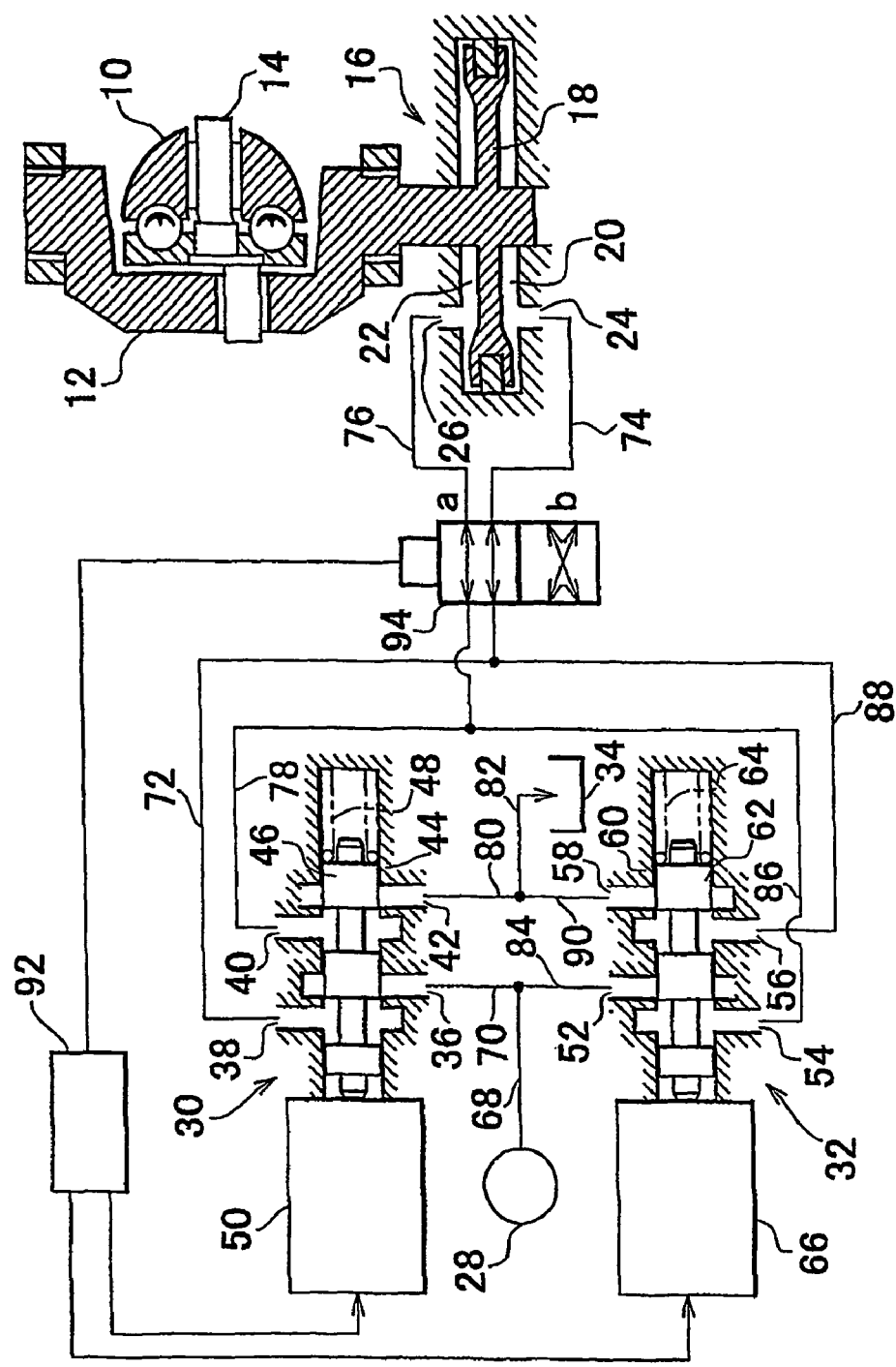
FIG. 3 shows another embodiment of the invention in which a directional control valve is added to the hydraulic control apparatus for the toroidal type continuously variable transmission shown in FIG. 1.

FIG. 3 represents another embodiment of the invention, which is similar to FIG. 1 except that a directional control valve 94 is added to the structure shown in FIG. 1. The directional control valve 94 is selectively operated by the control valve operation control unit 92 between a state "a" and a state "b".

The directional control valve 94 serves to maintain each controllability of the upshifting control and the downshifting control in spite of the failure that the predetermined pressurized oil is not supplied to the supply outlet port 38 or 54 of the oil flow control valve 30 or 32, respectively.

More specifically, when the operation of the directional control valve 94 is selected to the state "a", the hydraulic control apparatus is operated in the way as aforementioned referring to FIGS. 1 and 2. In the case where supply of the oil pressure cannot be stopped owing to sticking in the oil flow control valve 30 or 32, the other oil flow control valve serves to cope with the failure. When the electromagnetic drive unit 50 cannot be operated, the upshifting is interrupted but the downshifting can be performed. When the electromagnetic drive unit 66 cannot be operated, the downshifting is interrupted, but the upshifting can be performed. However, when a predetermined oil pressure is not supplied to the supply outlet port 38 of the oil flow control valve 30, the upshifting cannot be performed. If such failure occurs, the operation of the directional control valve is selected to the state "b". This makes it possible to ensure the upshifting control in spite of the failure that the predetermined oil pressure is not supplied to the supply outlet port 38 of the oil flow control valve 30.

Similarly when a predetermined oil pressure is not supplied to the supply outlet port 54 of the oil flow control valve 32, the downshifting cannot be performed. In this case, the operation of the directional control valve is selected to the state "b" only when the downshifting operation is performed. Then the downshifting control can be ensured in spite of the failure that the predetermined oil pressure is not supplied to the supply outlet port 54.

Figure 4:
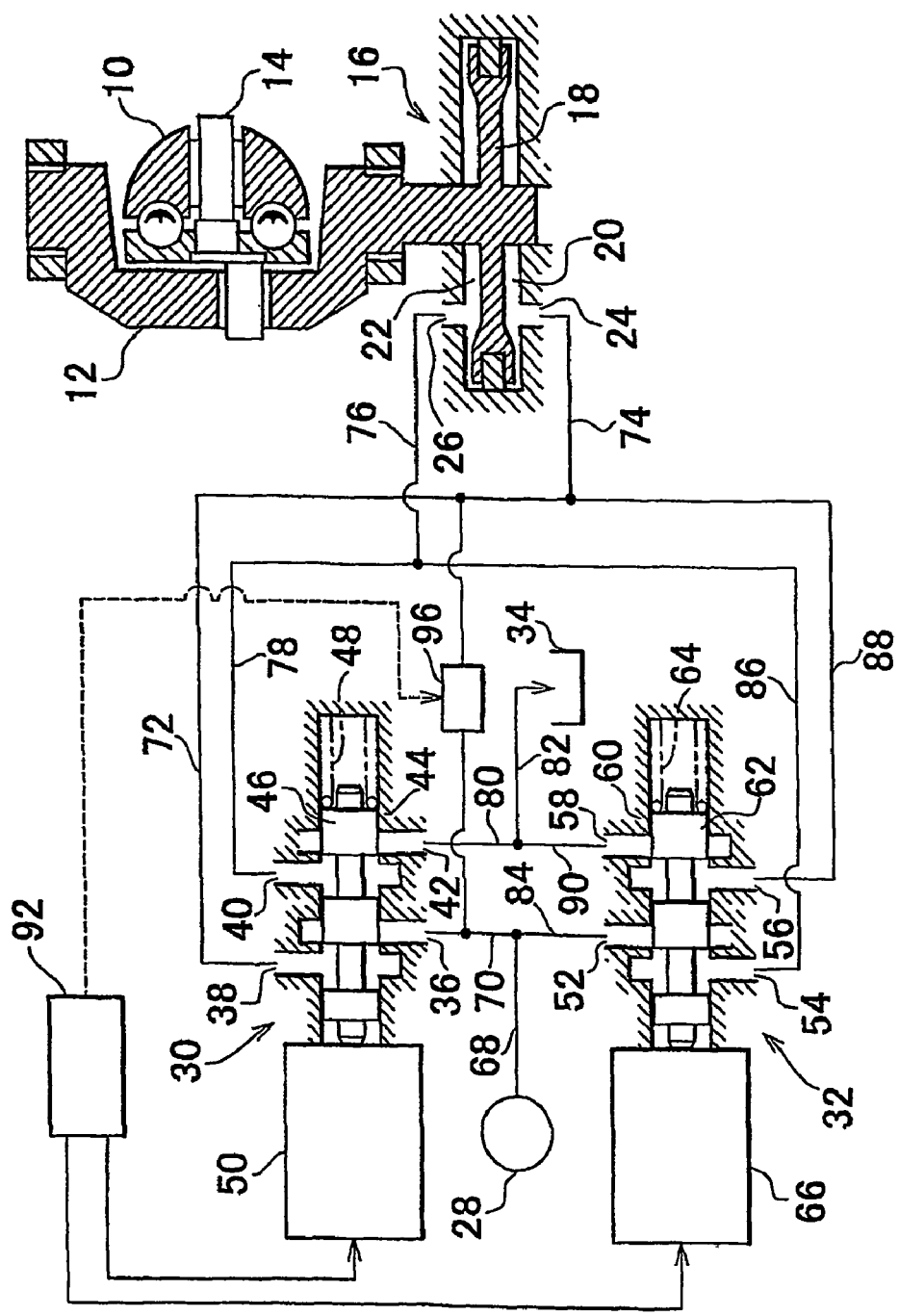
FIG. 4 shows another embodiment of the invention in which a depressurized oil supply unit is added to the hydraulic control apparatus for the toroidal type continuously variable transmission shown in FIG. 1.

FIG. 4 schematically shows another embodiment of the hydraulic control apparatus for controlling the toroidal type CVT similar to the one shown in FIG. 1. This embodiment includes an oil passage that directly supplies the pressurized oil from the pressurized oil source 28, which has been depressurized by a depressurize unit 96 into a port 24 of the hydraulic actuator 16. The depressurize unit 96 is continuously operated during operation of the hydraulic control apparatus, or under the control of the control valve operation control unit 92. Only when an appropriate hydraulic detection unit (not shown) detects the failure that the oil pressure is not supplied to the supply outlet port 38 of the oil flow control valve 30, the depressurize unit 96 may be activated such that the pressure of the pressurized oil from the pressurized oil source is depressurized to an intermediate level, and then supplied.

As mentioned above, the power roller is displaced along the direction in which the drive disc moves at the contact therebetween when it is driven by the drive disc, and tilted in the direction to increase the speed change ratio. In the embodiment shown in FIG. 4, the speed ratio is increased in response to the downward displacement of the power roller. Accordingly when the oil pressure within the hydraulic chamber 20 cannot be maintained owing to a certain failure in the oil flow control valve 30 or 32, the driving force exerted from the drive disc to the power roller 10 may rapidly bring the trunnion 12 into downward displacement, that is, the piston 18 may deflect in the downshifting direction.

The depressurize unit 96 is structured to be continuously operated with respect to the lower hydraulic chamber 20 as shown in FIG. 4, or to be operated only when an appropriate hydraulic detection unit (not shown) and the like detects the failure that the oil pressure is not applied to the supply outlet port 38 of the oil flow control valve 30. If the aforementioned depressurize unit 96 serves to supply the pressurized oil from the pressurized oil source, which has been depressurized to the intermediate level into the hydraulic chamber 20, the abrupt downshifting caused by the failure that the oil pressure within the hydraulic chamber 20 cannot be maintained may be prevented.

The oil pressure generated by the depressurize unit 96 may take an intermediate value as shown by Pc in the graph of FIG. 2B. In the case where such pressure is continuously applied, the relationship between the oil pressures Pu and Pd within the respective hydraulic chambers 20 and 22 and electric current values Iu and Id applied to the electromagnetic drive units 50 and 66 of the oil flow control valves 30 and 32 in normal operation states, respectively changes its feature from the one shown by the solid line Pu1/0/Pd1 to the one shown by the chain line Pu1/Pc/0/Pd1-Pc in the graph of FIG. 2B. When the oil flow control valve 30 stops supplying the pressurized oil, the control with the feature of Pc/0/Pd1-Pc is executed. In spite of the failure that the oil flow control valve 30 cannot supply the pressurized oil, the abrupt and rapid downshifting operation may be avoided in the toroidal type CVT.

If the depressurize unit 96 is structured to be operated only when the oil flow control valve 30 stops supplying the pressurized oil under the control of the control valve operation control unit 92, the Pd1 is temporarily increased upon operation of the depressurized unit 96 so as to make the value of the oil pressure Pd1-Pc close to the value of Pd1 as shown in FIG. 2B.

When the pressurized oil cannot be supplied from the oil flow control valve 30, the oil pressure for the upshifting operation is reduced from Pu1 to Pc, and the oil pressure for the downshifting operation is reduced from Pd1 to Pd1-Pc. If the control for reducing a torque of the engine (not shown) as the driving source of the toroidal type transmission by adjusting an opening degree of the electronic throttle is executed, the toroidal type transmission may be able to control speed ratio even in the state where the control oil pressure for the upshifting operation or the down shifting operation is reduced.

In the embodiment shown in FIG. 4, the depressurize unit 96 is described as being separated from the oil flow control valves 30 and 32. However, it may be formed as a depressurize port or a notch partially formed in the oil flow control valve 30 or 32, or the hydraulic actuator 16.

The invention has been described with reference to several embodiments. It is to be understood that the invention may be formed in various forms so long as it does not deviate from scope of the invention.

The invention claimed is:

1. A hydraulic control apparatus of a hydraulic servo unit that selectively changes an operation direction between a first direction when an oil is supplied from a first port and discharged from a second port and a second direction opposite to the first direction when the oil is supplied from the second port and discharged from the first port, the hydraulic control apparatus comprising:
a first oil flow control valve and a second oil flow control valve each including an oil supply control portion that controls an oil supply from a pressurized oil source, and an oil discharge control portion that controls a connection with an oil discharge passage;

a control valve operation controller that controls each operation of the first and the second oil flow control valves; and a depressurize oil supply unit that supplies a pressurized oil from the pressurized oil source, which has been depressurized to at least one of the first and the second ports by bypassing the first and the second oil flow control valves, wherein the first port receives an oil supply from the oil supply control portion of the first oil flow control valve, and discharges the oil through the oil discharge control portion of the second oil flow control valve, wherein the second port receives the oil supply from the oil supply control portion of the second oil flow control valve, and discharges the oil through the oil discharge control portion of the first oil flow control valve, wherein an operation state of the hydraulic servo unit is controlled by the control valve operation controller that controls each operation of the first and the second oil flow control valves, and wherein the hydraulic servo unit includes a toroidal type continuously variable transmission.

2. The hydraulic control apparatus according to claim 1, wherein the control valve operation controller controls only the first oil flow control valve by interrupting the control of the second oil flow control valve that supplies the oil from the pressurized oil source and passes the oil into the oil discharge passage such that the operation direction of the hydraulic servo unit is selected to the first operation direction.

3. The hydraulic control apparatus according to claim 1, wherein the control valve operation control means controls only the second oil flow control valve by interrupting the control of the first oil flow control valve that supplies the oil from the pressurized oil source and passes the oil into the oil discharge passage such that the operation direction of the hydraulic servo unit is selected to the second operation direction.

4. The hydraulic control apparatus according to claim 1, further comprising an oil passage selection unit that selectively changes an inlet between the first port and the second port.

5. The hydraulic control apparatus according to claim 1, wherein the hydraulic servo unit comprises a transmission for a vehicle, and the pressurized oil is supplied to a port to which the pressurized oil is supplied for an upshifting operation of the transmission by the depressurize oil supply unit.

6. The hydraulic control apparatus according to claim 1 wherein the depressurize oil supply unit is activated when one of the first and the second oil flow control valves fails to supply the pressurized oil.

7. The hydraulic control apparatus according to claim 1, wherein an oil pressure of the pressurize oil source is temporarily increased when the depressurize oil supply unit is operated.

8. The hydraulic control apparatus according to claim 1, wherein a control for reducing a torque input to the hydraulic servo unit is executed when the depressurize oil supply unit is operated.

9. The hydraulic control apparatus according to claim 1, wherein an engine output of the vehicle is reduced when the depressurize oil supply unit is operated.

10. The hydraulic control apparatus according to claim 1, wherein:
the toroidal type continuously variable transmission includes a roller supported by a support member and interposed between a pair of rotating members, and an actuator having a piston connected to the support member and an upper hydraulic chamber formed above the piston and a lower hydraulic chamber formed below the piston; and the roller is deflected with respect to the rotating members while the actuator is displacing the support member in a vertical direction.

11. The hydraulic control apparatus according to claim 10, wherein the control valve operation controller serves to activate the second oil flow control valve when the toroidal type continuously variable transmission is operated in the first operation direction, and the first oil flow control valve fails to stop supplying the oil to the lower hydraulic chamber after a flow rate of the supplied oil exceeds a predetermined target value.

12. The hydraulic control apparatus according to claim 10, wherein the control valve operation controller serves to activate the first oil flow control valve when the toroidal type continuously variable transmission is operated in the second operation direction, and the second oil flow control valve fails to stop supplying the oil to the upper hydraulic chamber after a flow rate of the supplied oil exceeds a predetermined target value.

13. A method of controlling a hydraulic control apparatus of a hydraulic servo unit that selectively changes an operation direction between a first direction when an oil is supplied from a first port and discharged from a second port and a second direction opposite to the first direction when the oil is supplied from the second port and discharged from the first port, the hydraulic control apparatus including a first oil flow control valve and a second oil flow control valve each including an oil supply control portion that controls an oil supply from a pressurized oil source, and an oil discharge control portion that controls a connection to an oil discharge passage, the method comprising:

controlling an oil supply from the oil supply control portion of the first oil flow control valve and an oil discharge through the oil discharge control portion of the second oil flow control valve; and controlling an oil supply from the oil supply control portion of the second oil flow control valve and an oil discharge through the oil discharge control portion of the first oil flow control valve, wherein the hydraulic servo unit includes a toroidal type continuously variable transmission, and wherein a pressurized oil from the pressurized oil source, which has been depressurized, is supplied to at least one of the first and the second port by bypassing the first and the second oil flow control valves.

14. The method according to claim 13, wherein the first oil flow control valve is only controlled by interrupting the control of the second oil flow control valve that supplies the oil from the pressurized oil source and passes the oil into the oil discharge passage such that the operation direction of the hydraulic servo unit is selected to the first operation direction.

15. The method according to claim 13, wherein the second oil flow control valve is only controlled by interrupting the control of the first oil flow control valve that supplies the oil from the pressurized oil source and passes the oil into the oil discharge passage such that the operation direction of the hydraulic servo unit is selected to the second operation direction.

16. The method according to claim 13, further comprising selectively changing an inlet between the first port and the second port.

17. The method apparatus according to claim 13, wherein the pressurized oil from the pressurized oil source, which has been depressurized, is supplied to at least one of the first and the second port by bypassing the first and the second oil flow control valves when one of the first and the second oil flow control valves fail to supply the pressurized oil.

18. The method according to claim 13, wherein an oil pressure of the pressurize oil source is temporarily increased when the pressurized oil from the pressurized oil source, which has been depressurized, is supplied.

19. The method according to claim 13, wherein a control for reducing a torque input to the hydraulic servo unit is executed when the pressurized oil from the pressurized oil source, which has been depressurized, is supplied.

20. The method according to claim 13, wherein an engine output of the vehicle is reduced when the pressurized oil from the pressurized oil source, which has been depressurized, is supplied.

* * * * *